US012695618B2

(12) United States Patent
Luo

(10) Patent No.: US 12,695,618 B2
(45) Date of Patent: Jul. 28, 2026

(54) MESSAGE PUSH METHOD, ELECTRONIC DEVICE, AND STORAGE MEDIUM

(71) Applicant: Petal Cloud Technology Co., Ltd., Dongguan City (CN)

(72) Inventor: Zhenhui Luo, Dongguan (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 514 days.

(21) Appl. No.: 18/028,040

(22) PCT Filed: Aug. 4, 2021

(86) PCT No.: PCT/CN2021/110461
§ 371 (c)(1),
(2) Date: Mar. 23, 2023

(87) PCT Pub. No.: WO2022/062688
PCT Pub. Date: Mar. 31, 2022

(65) Prior Publication Data
US 2023/0344644 A1    Oct. 26, 2023

(30) Foreign Application Priority Data

Sep. 24, 2020    (CN) .......................... 202011013923.2

(51) Int. Cl.
*H04L 9/32*        (2006.01)
*H04L 67/55*       (2022.01)
(52) U.S. Cl.
CPC ............ *H04L 9/3247* (2013.01); *H04L 67/55* (2022.05)

(58) Field of Classification Search
None
See application file for complete search history.

(56) References Cited

U.S. PATENT DOCUMENTS 8,108,679 B2 *  1/2012  Wiseman ............ H04L 63/0209
                                          713/176
9,485,208 B2 *  11/2016  Marcellino ........... H04L 51/224
(Continued)

FOREIGN PATENT DOCUMENTS

| CN | 102006567 A | 4/2011 |
| CN | 104767746 A | 7/2015 |
| CN | 106385491 A | 2/2017 |

OTHER PUBLICATIONS

Stallings (William Stallings, "Cryptography and network security", 2th edition, 1998, ISBN: 0138690170) (Year: 1998).*
(Continued)

*Primary Examiner* — Piotr Poltorak
(74) *Attorney, Agent, or Firm* — Conley Rose, P.C.

(57) ABSTRACT

A method includes: creating a mapping relationship between an application identifier and a preset key; sending the mapping relationship to a message provider; receiving a to-be-pushed message and a message push request from the message provider, where the message push request includes first information and a first digest; performing digest extraction on the first information in the message push request using the preset key to obtain a second digest; comparing the second digest with the first digest; and pushing the to-be-pushed message to a message receiver corresponding to the application identifier when the second digest is consistent with the first digest.

20 Claims, 8 Drawing Sheets

(56) References Cited

U.S. PATENT DOCUMENTS

| | | | | |
|---|---|---|---|---|
| 10,187,486 | B1 | 1/2019 | Toksoz et al. | |
| 10,721,272 | B2 * | 7/2020 | Verma ................. | H04W 12/088 |
| 2005/0177717 | A1 * | 8/2005 | Grosse ................ | H04L 63/1466 |
| | | | | 713/160 |
| 2006/0236370 | A1 * | 10/2006 | John ....................... | H04L 61/00 |
| | | | | 726/1 |
| 2014/0215573 | A1 * | 7/2014 | Cepuran ............. | G06F 21/6218 |
| | | | | 726/4 |
| 2018/0145986 | A1 * | 5/2018 | Chien .................. | H04L 63/101 |
| 2020/0314089 | A1 * | 10/2020 | Lasynetskyi ............ | G06F 21/33 |

OTHER PUBLICATIONS

D. Hardt, Ed. et al., The OAuth 2.0 Authorization Framework, Request for Comments: 6749, Oct. 2012, 76 pages.
M. Jones et al., JSON Web Token (JWT) Profile for OAuth 2.0 Client Authentication and Authorization Grants, Request for Comments: 7523, May 2015, 12 pages.
J. Richer, Ed. et al., OAuth 2.0 Dynamic Client Registration Protocol, Request for Comments: 7591, Jul. 2015, 39 pages.

* cited by examiner

300

310

MESSAGE PUSH METHOD, ELECTRONIC DEVICE, AND STORAGE MEDIUM

CROSS-REFERENCE TO RELATED APPLICATIONS

This is a U.S. National Stage of International Patent Application No. PCT/CN2021/110461 filed on Aug. 4, 2021, which claims priority to Chinese Patent Application No. 202011013923.2 filed on Sep. 24, 2020. Both of the aforementioned applications are hereby incorporated by reference in their entireties.

TECHNICAL FIELD

Embodiments of this application relate to the field of communications technologies, and in particular, to a message push method, an electronic device, and a storage medium.

BACKGROUND

Currently, the open authorization (Open Authorization, OAUTH) protocol provides a secure, open, and simple standard for user resource authorization. A difference from previous authorization is that authorization of the OAUTH protocol does not allow a third party to access user account information (such as a user name and a password). In other words, the third party can apply for user resource authorization without using the user name and the password. The OAUTH protocol further provides authentication between servers based on a network verification code (Json Web Token, JWT) manner.

However, in a push hierarchy, a message provider may send a message to an incorrect message receiver (message crosstalk), causing a security event. For example, a message provider A can only send a message to a message receiver A, but may send a message to a message receiver B or a message receiver C, causing message crosstalk.

SUMMARY

Embodiments of this application provide a message push method, an electronic device, and a storage medium. A message push request of a message provider is verified at a message pusher, and a to-be-pushed message is pushed after the verification succeeds, to avoid message crosstalk, and further improve message push security of the message provider.

According to a first aspect, an embodiment of this application provides a message push method, including:

creating a mapping relationship between an application identifier and a preset key; sending the mapping relationship to a message provider; specifically, pre-creating the mapping relationship between the application identifier and the preset key at the message pusher, where the application identifier is used to identify an application, and the preset key may be a symmetric or asymmetric key commonly used in the art;

receiving a to-be-pushed message and a message push request that are sent by the message provider, where the message push request includes first information and a first digest used for verification, the first digest is obtained after the message provider performs digest extraction on the first information by using the preset key, and the first information includes at least the application identifier. Specifically, the message provider may be an object that provides the to-be-pushed message to a message receiver, the to-be-pushed message may include a bulletin message, a notification message, and another type of to-be-pushed message related to the application; the first information includes at least the application identifier; the first information may also include declaration information such as a JWT issuer, an issuance time, and an issuance effective time; and this is not specially limited in this embodiment of this application;

querying whether the preset key corresponding to the application identifier in the message push request exists; if the preset key corresponding to the application identifier exists, performing digest extraction on the first information in the message push request by using the preset key, to obtain a second digest, where specifically, searching may be performed based on the mapping relationship between the application identifier and the preset key, to determine whether the preset key corresponding to the application identifier in the message push request exists; and comparing the second digest with the first digest, and pushing the to-be-pushed message to a message receiver corresponding to the application identifier if the second digest is consistent with the first digest. Specifically, if the second digest is consistent with the first digest, the message pusher may push the to-be-pushed message, where the push target object may be the message receiver corresponding to the application identifier in the message push request, for example, the message receiver may include a mobile terminal on which the application corresponding to the application identifier is installed; and if the second digest is inconsistent with the first digest, a failure message may be returned to the message provider, and the current message push task may be ended.

The message push request carries digest information and receiver information, and the message pusher performs comparison based on the digest information to complete verification of the message push request. After the verification succeeds, the to-be-pushed message is sent to the receiver corresponding to the receiver information, to avoid message crosstalk, and improve security of message push.

In a possible implementation, the message push request further includes a signature of the message provider, and before the comparing the second digest with the first digest, the method further includes:

performing identity authentication on the message push request based on the signature to determine whether an identity of the message provider is legal.

In a possible implementation, the method further includes:

if the preset key corresponding to the application identifier does not exist, terminating push of the current to-be-pushed message. Specifically, if it is determined that the preset key cannot be found, it may be considered that the message pusher is an unauthorized user, that is, the message pusher has no right to push the message. Therefore, the push of the to-be-pushed message may be terminated, to improve system efficiency and message push security.

In a possible implementation, the first information includes a plurality of application identifiers, the message push request includes a plurality of first digests corresponding to the application identifiers, and the performing digest extraction on the first information in the message push request by using the preset key, to obtain a second digest includes:

separately performing digest extraction on the first information in the message push request by using preset keys corresponding to the application identifiers, to obtain a plurality of second digests corresponding to the application identifiers. Specifically, the first information may include a plurality of application identifiers, that is, the to-be-pushed message may be pushed to a plurality of receivers. Therefore, the message pusher may perform digest extraction on the first information by using each preset key corresponding to the application identifier, to obtain the plurality of second digests.

In a possible implementation, the comparing the second digest with the first digest, and pushing the to-be-pushed message to a message receiver corresponding to the application identifier if the second digest is consistent with the first digest includes:

comparing a first digest and a second digest that correspond to a same application identifier; and if first digests and second digests of all the application identifiers are consistent, pushing the to-be-pushed message to message receivers corresponding to the application identifiers. Specifically, each first digest is compared with a corresponding second digest. If all first digests are consistent with corresponding second digests, the to-be-pushed message may be pushed to the message receivers corresponding to the application identifiers. In this way; a plurality of to-be-pushed messages may be pushed while ensuring message push security.

An embodiment of this application further provides a message push method; including:

receiving a to-be-pushed message and a message push request that are sent by a message provider, where the message push request includes an application identifier and a message provider identifier; and specifically, the application identifier is used to identify an application, and the message provider identifier is used to identify the message provider;

querying whether a first data source corresponding to the application identifier in the message push request and a second data source corresponding to the message provider identifier in the message push request exist, where specifically, a message pusher may prestore a mapping relationship between the application identifier and the first data source, and a mapping relationship between the message provider identifier and the second data source; and whether the corresponding first data source and second data source exist may be queried based on the application identifier and the message provider identifier; and if the first data source and the second data source exist, comparing the first data source with the second data source, and if the first data source is consistent with the second data source, pushing the to-be-pushed message to a message receiver corresponding to the application identifier.

The message push request carries the application identifier and the message provider identifier, the corresponding first data source and second data source are obtained through query based on the application identifier and the message provider identifier, and the verification on the message push request is completed by comparing the first data source with the second data source. In this way, message crosstalk can be avoided, and security of message push can be improved.

In a possible implementation, before the receiving a to-be-pushed message and a message push request that are sent by a message provider, the method further includes:

receiving an identity registration request sent by the message provider, where the identity registration request includes a data source and an identity registration type, and the identity registration type includes a first type and a second type; and specifically, the data source may be used to identify a source address at which the message provider stores data, and the identity registration type may be used to identify an identifier of an object requested by the message provider this time, for example; the first type may correspond to the identifier of the message provider, and the second type may correspond to the application identifier; and if it is determined that the identity registration type is the first type, determining that the data source includes a first data source, allocating a message provider identifier, associating the message provider identifier with the first data source for storage, and sending the message provider identifier to the message provider; or if it is determined that the identity registration type is the second type, determining that the data source includes a second data source, allocating an application identifier, associating the application identifier with the second data source for storage, and sending the application identifier to the message provider. Specifically, the message pusher may allocate the message provider identifier or the application identifier based on the identity registration type, and the message pusher may separately associate the message provider identifier with the first data source or associate the application identifier with the second data source and then store the message provider identifier or the application identifier locally. Through two registration processes, the registration of the message provider and the registration of the application corresponding to the message provider may be completed respectively.

In a possible implementation, if it is determined that the identity registration type is the second type, the identity registration request further includes a message provider identifier, and the method further includes:

performing query based on the message provider identifier to obtain a corresponding first data source; and comparing the first data source obtained through query with the second data source in the identity registration request, and determining, based on a comparison result, whether to allocate the application identifier. Specifically, when the application is registered, the second data source carried in the identity registration request should be consistent with the first data source. Therefore, whether the first data source is consistent with the second data source is determined, to determine whether to allocate the application identifier. In this way, security of the application registration can be improved.

In a possible implementation, the message push request includes a plurality of application identifiers, and the comparing the first data source with the second data source, and if the first data source is consistent with the second data source, pushing the to-be-pushed message to a message receiver corresponding to the application identifier includes:

comparing each first data source and each second data source corresponding to the application identifier; and if each first data source is consistent with each second data source, pushing the to-be-pushed message to message receivers corresponding to the application identifiers. Specifically, each first data source may be compared with a second data source. If each first data source is consistent with the second data source, the to-be-pushed message may be pushed to the message receiver corresponding to the application identifier. In this way, a plurality of to-be-pushed messages may be pushed while ensuring message push security.

According to a second aspect, an embodiment of this application provides a message push apparatus, including:

a creation module, configured to create a mapping relationship between an application identifier and a preset key;

a sending module, configured to send the mapping relationship to a message provider:

a receiving module, configured to receive a to-be-pushed message and a message push request that are sent by the message provider, where the message push request includes first information and a first digest used fir verification, the first digest is obtained after the message provider performs digest extraction on the first information by using the preset key, and the first information includes at least the application identifier;

a verification module, configured to query whether the preset key corresponding to the application identifier in the message push request exists, and if the preset key corresponding to the application identifier exists, perform digest extraction on the first information in the message push request by using the preset key, to obtain a second digest; and a push module, configured to compare the second digest with the first digest, and push the to-be-pushed message to a message receiver corresponding to the application identifier if the second digest is consistent with the first digest.

In a possible implementation, the message push request further includes a signature of the message provider, and the apparatus further includes:

a signature verification module, configured to perform identity authentication on the message push request based on the signature to determine whether an identity of the message provider is legal.

In a possible implementation, the verification module is further configured to: if the preset key corresponding to the application identifier does not exist, terminate push of the current to-be-pushed message. In a possible implementation, the first information includes a plurality of application identifiers, the message push request includes a plurality of first digests corresponding to the application identifiers, and the verification module is further configured to separately perform digest extraction on the first information in the message push request by using preset keys corresponding to the application identifiers, to obtain a plurality of second digests corresponding to the application identifiers.

In a possible implementation, the push module is further configured to compare a first digest and a second digest that correspond to a same application identifier; and if first digests and second digests of all the application identifier are consistent, push the to-be-pushed message to message receivers corresponding to the application identifiers.

An embodiment of this application further provides a message push apparatus, including:

a receiving module, configured to receive a to-be-pushed message and a message push request that are sent by a message provider, where the message push request includes an application identifier and a message provider identifier;

a verification module, configured to query whether a first data source corresponding to the application identifier in the message push request and a second data source corresponding to the message provider identifier in the message push request exist; and a push module, configured to: if the first data source and the second data source exist, compare the first data source with the second data source, and if the first data source is consistent with the second data source, push the to-be-pushed message to a message receiver corresponding to the application identifier.

In a possible implementation, the apparatus further includes:

a registration module, configured to: receive an identity registration request sent by the message provider, where the identity registration request includes a data source and an identity registration type, and the identity registration type includes a first type and a second type; and if it is determined that the identity registration type is the first type, determine that the data source includes a first data source, allocate a message provider identifier, associate the message provider identifier with the first data source for storage, and send the message provider identifier to the message provider; or if it is determined that the identity registration type is the second type, determine that the data source includes a second data source, allocate an application identifier, associate the application identifier with the second data source for storage, and send the application identifier to the message provider.

In a possible implementation, if it is determined that the identity registration type is the second type, the identity registration request further includes a message provider identifier, and the apparatus further includes:

a check module, configured to: perform query based on the message provider identifier to obtain a corresponding first data source; and compare the first data source obtained through query with the second data source in the identity registration request, and determine, based on a comparison result, whether to allocate the application identifier.

In a possible implementation, the message push request includes a plurality of application identifiers, and the push module is further configured to: compare each first data source and each second data source corresponding to the application identifier: and if each first data source is consistent with each second data source, push the to-be-pushed message to message receivers corresponding to the application identifiers.

According to a third aspect, an embodiment of this application provides an electronic device, including: a processor and a memory, where the memory is configured to store computer program code, the computer program code includes instructions, and when the processor reads the instructions from the memory, the electronic device is enabled to perform the following steps:

creating a mapping relationship between an application identifier and a preset key;

sending the mapping relationship to a message provider;

receiving a to-be-pushed message and a message push request that are sent by the message provider, where the message push request includes first information and a first digest used for verification, the first digest is obtained after the message provider performs digest extraction on the first information by using the preset key, and the first information includes at least the application identifier;

querying whether the preset key corresponding to the application identifier in the message push request exists;

if the preset key corresponding to the application identifier exists, performing digest extraction on the first information in the message push request by using the preset key, to obtain a second digest; and comparing the second digest with the first digest, and pushing the to-be-pushed message to a message receiver corresponding to the application identifier if the second digest is consistent with the first digest.

In a possible implementation, the message push request further includes a signature of the message provider, and when the instructions are executed by the electronic device, before comparing the second digest with the first digest, the electronic device further executes the following step:

performing identity authentication on the message provider based on the signature to determine whether an identity of the message provider is legal.

In a possible implementation, when the instructions are executed by the electronic device, the electronic device is further enabled to perform the following step:

if the preset key corresponding to the application identifier does not exist, terminating push of the current to-be-pushed message.

In a possible implementation, the first information includes a plurality of application identifiers, the message push request includes a plurality of first digests corresponding to the application identifiers, and when the instructions are executed by the electronic device, that the electronic device is enabled to perform the step of performing digest extraction on the first information in the message push request by using the preset key, to obtain a second digest includes:

separately performing digest extraction on the first information in the message push request by using preset keys corresponding to the application identifiers, to obtain a plurality of second digests corresponding to the application identifiers.

In a possible implementation, when the instructions are executed by the electronic device, that the electronic device is enabled to perform the step of comparing the second digest with the first digest, and pushing the to-be-pushed message to a message receiver corresponding to the application identifier if the second digest is consistent with the first digest includes:

comparing a first digest and a second digest that correspond to a same application identifier; and if first digests and second digests of all the application identifiers are consistent, pushing the to-be-pushed message to message receivers corresponding to the application identifiers.

An embodiment of this application further provides an electronic device, including: a processor and a memory, where the memory is configured to store computer program code, the computer program code includes instructions, and when the processor reads the instructions from the memory, the electronic device is enabled to perform the following steps:

receiving a to-be-pushed message and a message push request that are sent by a message provider, where the message push request includes an application identifier and a message provider identifier;

querying whether a first data source corresponding to the application identifier in the message push request and a second data source corresponding to the message provider identifier in the message push request exist; and if the first data source and the second data source exist, comparing the first data source with the second data source, and if the first data source is consistent with the second data source, pushing the to-be-pushed message to a message receiver corresponding to the application identifier.

In a possible implementation, when the instructions are executed by the electronic device, before receiving the to-be-pushed message and the message push request that are sent by the message provider, the electronic device is further enabled to perform the following steps:

receiving an identity registration request sent by the message provider, where the identity registration request includes a data source and an identity registration type, and the identity registration type includes a first type and a second type; and if it is determined that the identity registration type is the first type, determining that the data source includes a first data source, allocating a message provider identifier, associating the message provider identifier with the first data source for storage, and sending the message provider identifier to the message provider; or if it is determined that the identity registration type is the second type, determining that the data source includes a second data source, allocating an application identifier, associating the application identifier with the second data source for storage, and sending the application identifier to the message provider.

In a possible implementation, if it is determined that the identity registration type is the second type, the identity registration request further includes a message provider identifier, and when the instructions are executed by the electronic device, the electronic device is further enabled to perform the following steps:

performing query based on the message provider identifier to obtain a corresponding first data source; and comparing the first data source obtained through query with the second data source in the identity registration request, and determining, based on a comparison result, whether to allocate the application identifier.

In a possible implementation, the message push request includes a plurality of application identifiers, and when the instructions are executed by the electronic device, that the electronic device is enabled to perform the step of comparing the first data source with the second data source, and if the first data source is consistent with the second data source, pushing the to-be-pushed message to a message receiver corresponding to the application identifier includes:

comparing each first data source and each second data source corresponding to the application identifier; and if each first data source is consistent with each second data source, pushing the to-be-pushed message to message receivers corresponding to the application identifiers.

According to a fourth aspect, an embodiment of this application provides a computer-readable storage medium. The computer-readable storage medium stores a computer program, and when the computer program is run on a computer, the computer is enabled to perform the method according to the first aspect.

According to a fifth aspect, an embodiment of this application provides a computer program. When the computer program is executed by a computer, the method according to the first aspect is performed.

In a possible design, the program in the fifth aspect may be fully or partially stored on a storage medium encapsulated with a processor, or may be fully or partially stored in a memory not encapsulated with a processor.

US 12,695,618 B2

9
10

DESCRIPTION OF EMBODIMENTS

Figure 1:
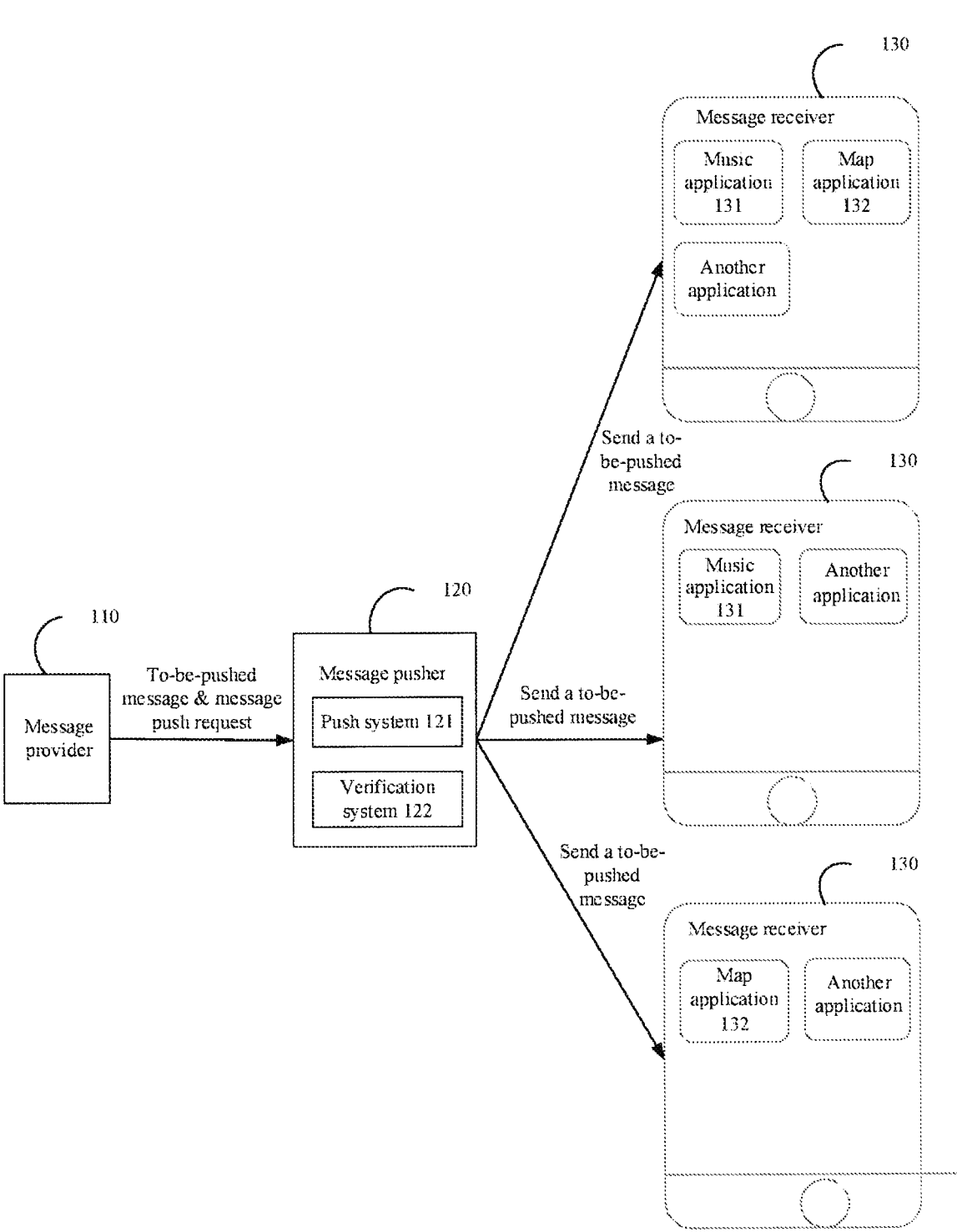
FIG. 1 is a schematic diagram of an application scenario of a message push method according to an embodiment of this application.

The following describes technical solutions in embodiments of this application with reference to the accompanying drawings in embodiments of this application. In the description of embodiments of this application, unless otherwise specified, "/" indicates an "or" relationship. For example, A/B may represent A or B. "and/or" in this specification is merely an association relationship for describing associated objects, and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In the description of embodiments of this application, unless otherwise specified, "a plurality of" means two or more.

JWT is a JSON-based open standard executed to transfer a declaration between network application environments. JWT is designed to be compact and secure and is especially suitable for single sign-on (SSO) of distributed sites, the declaration of the JWT is generally used to transfer authenticated user identity information between an identity provider and a service provider, to obtain resources from a resource server. Some additional declaration information required by other service logic may also be added. In addition, the JWT may also be directly used for authentication, or may be encrypted. The JWT may include three parts: a first part is a header, a second part is a payload, and a third part is a signature.

The JWT may be used for signature authentication. For example, the message provider may send a message push request to the message pusher in a JWT manner. After performing signature authentication on the message push request, the message pusher determines whether the identity of the message provider is valid, that is, determines whether the message provider can push the to-be-pushed message to a message receiver. However, the current signature authentication manner cannot determine the message receiver to which the to-be-pushed message will be pushed, and it is possible that the to-be-pushed message sent to a message receiver A is sent to a message receiver B. Therefore, the foregoing signature authentication manner cannot resolve a problem of message crosstalk, and may bring a security risk to data push of a message provider.

Based on the foregoing problem, an embodiment of this application provides a message push method.

The message push method provided in this embodiment of this application may be applied to a data processing device. The data processing device may be a server. A specific form of the data processing device that performs the technical solution is not specially limited in this application.

An application scenario of this embodiment of this application is shown in FIG. 1. The application scenario includes a message provider 110, a message pusher 120, and a message receiver 130. The message provider 110 is configured to send a to-be-pushed message and a message push request to the message pusher 120, so that the message pusher 120 pushes the to-be-pushed message after verifying the message push request. For example, the to-be-pushed message may include a bulletin message, a notification message, and another type of message that are related to an application. For example, the to-be-pushed message may be "bulletin information about upgrading a service at 1:00 am." Alternatively, the to-be-pushed message may be another type of message. This is not specially limited in this embodiment of this application.

The message pusher 120 is configured to receive the to-be-pushed message and the message push request that are sent by the message provider 110, verify the message push request, and push the to-be-pushed message to the correct message receiver 130. The message pusher 120 includes a push system 121 and a verification system 122. The verification system 122 is configured to verify the message push request. The push system 121 is configured to push the to-be-pushed message to the message receiver 130 after the message push request passes the verification.

It should be noted that the to-be-pushed message sent by the message provider 110 is based on an application. Therefore, the message pusher 120 may push the to-be-pushed message to a corresponding application installed on the message receiver 130 (for example, a mobile terminal). For example, when the message pusher 120 pushes a bulletin message corresponding to a music application 131, if the music application 131 is installed on the message receiver 130, the bulletin message may be received.

The message receiver 130 is configured to receive messages pushed by the message pusher 120. The message receiver 130 may be a mobile terminal on which an application (for example, the music application 131 or a map application 132) is installed, or may be another type of terminal on which the foregoing application is installed. This is not specially limited in this application.

Figure 2:
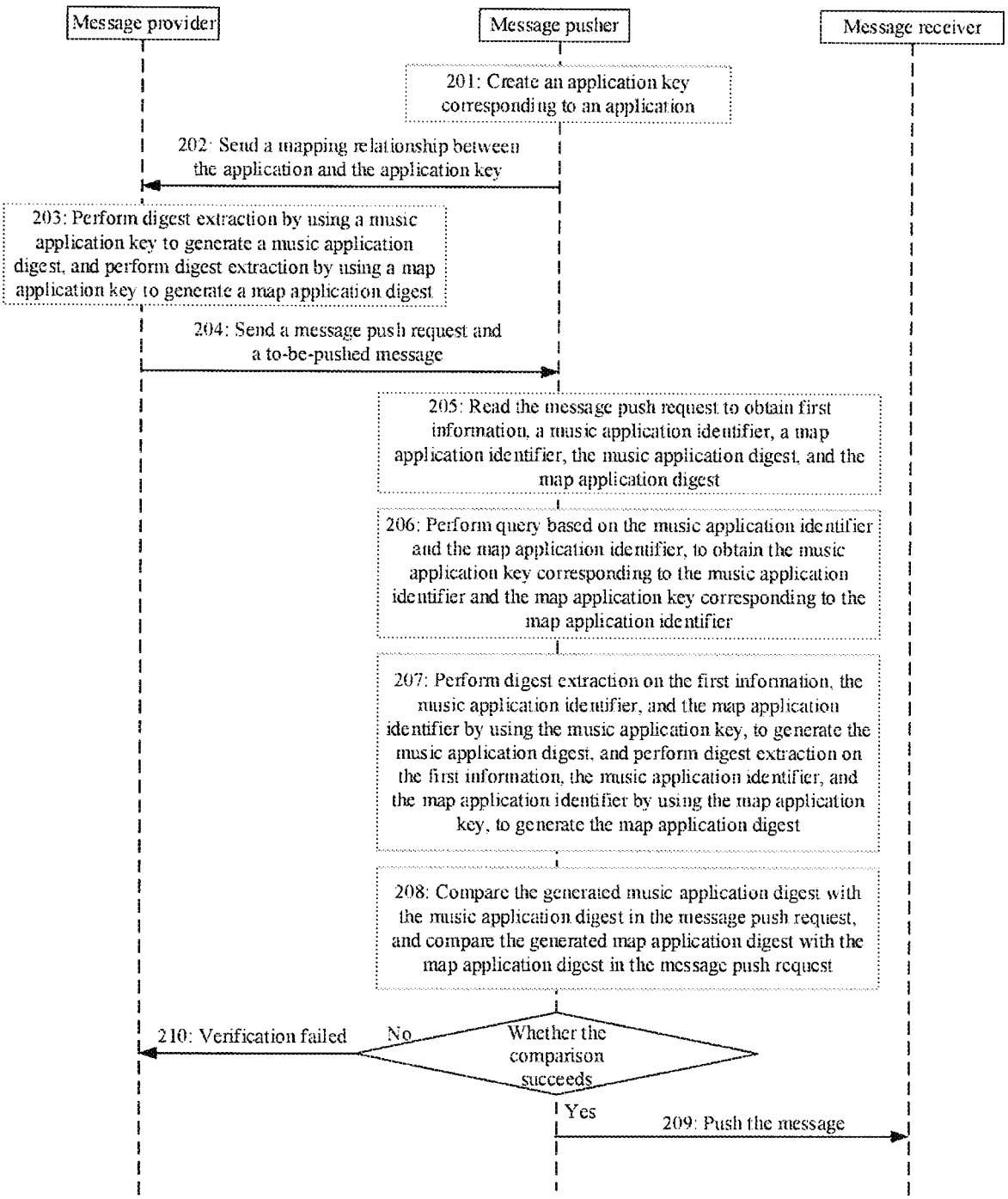
FIG. 2 is a schematic flowchart of an interaction procedure of an embodiment of a message push method according to an embodiment of this application.

With reference to FIG. 2 to FIG. 5, a message push method provided in an embodiment of this application is described by using an example in which a message provider 110 sends two to-be-pushed messages respectively corresponding to the music application 131 and the map application 132. FIG. 2 is a schematic flowchart of an interaction procedure of an embodiment of a message push method according to this application, and the method includes the following steps.

Step 201: A message pusher 120 creates an application key corresponding to an application.

Specifically, the message pusher 120 may preset identifiers of a plurality of applications (for example, a music application, a map application, and a meal ordering application). For example, a music application ID may be set for the music application 131, or a map application ID may be set for the map application 132. It may be understood that the application identifier is used to identify the application. Optionally, the application identifier may also be sent by the message provider 110 to the message pusher 120 in advance. This is not specially limited in this application.

After obtaining the application identifier, the message pusher 120 may create a corresponding application key for each application. For example, the message pusher 120 may create a corresponding application key (referred to as a music application key) for the music application 131 and may create a corresponding application key (referred to as a map application key) for the map application 132. The application key may be a symmetric or an asymmetric key commonly used in the art. This is not specially limited in this embodiment of this application.

Step 202: The message pusher 120 sends a mapping relationship between the application and the application key to the message provider 110.

Specifically, the message pusher 120 may establish a one-to-one mapping relationship between the application and the application key and may store the mapping relationship in a local database. Next, the message pusher 120 may send the mapping relationship to the message provider 110. In a specific implementation, the local database may be disposed in the verification system 122 in the message pusher 120.

Step 203: The message provider 110 obtains declaration information, an identifier of the music application 131, and an identifier of the map application 132, performs digest extraction on the declaration information, the identifier of the music application 131, and the identifier of the map application 132 by using the music application key to generate a corresponding digest (referred to as a music application digest), and performs digest extraction on the declaration information, the identifier of the music application 131, and the identifier of the map application 132 by using the map application key, to generate a corresponding digest (referred to as a map application digest).

Specifically, the declaration information may include information related to the message push request, where the message push request is used by the message provider 100 to request the message pusher 200 to push the to-be-push message. The message push request may be sent in a JWT manner. Therefore, the declaration information may include declaration information registered by the JWT in a standard protocol. For example, the declaration information may include an issuer (for example, a server that issues the JWT), an issuance time (for example, a moment at which the JWT is issued), an issuance effective time (for example, an effective time period of the JWT), and related information. For details, refer to the protocol RFC 7523. Details are not described herein again. In addition, the declaration information may also include other related information. Specific content and a form of the declaration information are not specially limited in this embodiment of this application.

Further, because the mapping relationship between the application and the application key is stored in the local database of the message provider 110, after obtaining the declaration information, the identifier of the music application 131, and the identifier of the map application 132, the message provider 110 may use the mapping relationship to obtain the corresponding music application key by query based on the identifier of the music application 131 and obtain the corresponding map application key by query based on the identifier of the map application 132. Digest extraction on the declaration information, the identifier of the music application 131, and the identifier of the map application 132 is performed by using the music application key, to obtain the music application digest corresponding to the identifier of the music application 131. Similarly, the message provider 110 may further perform digest extraction on the declaration information, the identifier of the music application 131, and the identifier of the map application 132 by using the map application key, to obtain the map application digest corresponding to the identifier of the map application 132. A digest extraction manner may be an HASHIMAC512 manner, or may be another digest extraction manner. This is not specially limited in this embodiment of this application.

It should be noted that, when performing digest extraction, the message provider 110 may not perform digest extraction on the declaration information. For example, the message provider 110 may perform digest extraction on the identifier of the music application 131 and the identifier of the map application 132, to obtain the music application digest corresponding to the identifier of the music application 131, and perform digest extraction on the identifier of the music application 131 and the identifier of the map application 132, to obtain the map application digest corresponding to the identifier of the map application 132. That is, the declaration information is optional information when the message provider 110 performs digest extraction.

Step 204: The message provider 110 sends a to-be-pushed message and a message push request to the message pusher 120, where the message push request includes the declaration information, the identifier of the music application 131, the identifier of the map application 132, the music application digest, and the map application digest.

Specifically, after obtaining the music application digest and the map application digest, the message provider 110 may generate the message push request based on the declaration information, the identifier of the music application 131, the identifier of the map application 132, the music application digest, and the map application digest. The message push request may be used by the message provider 100 to request the message pusher 120 to push the to-be-pushed message sent by the provider 110, and the message push request may be in a form of a JWT.

Figure 3A:
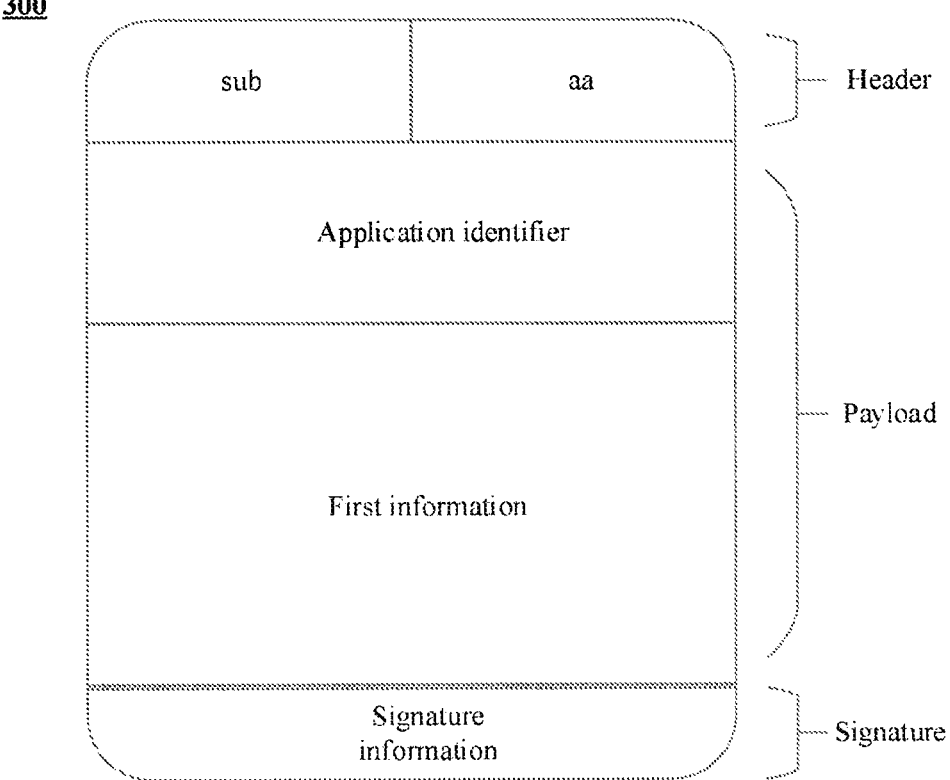
FIG. 3A is a schematic diagram of a structure of an embodiment of a message push request in a MIT format according to an embodiment of this application.
Figure 3B:
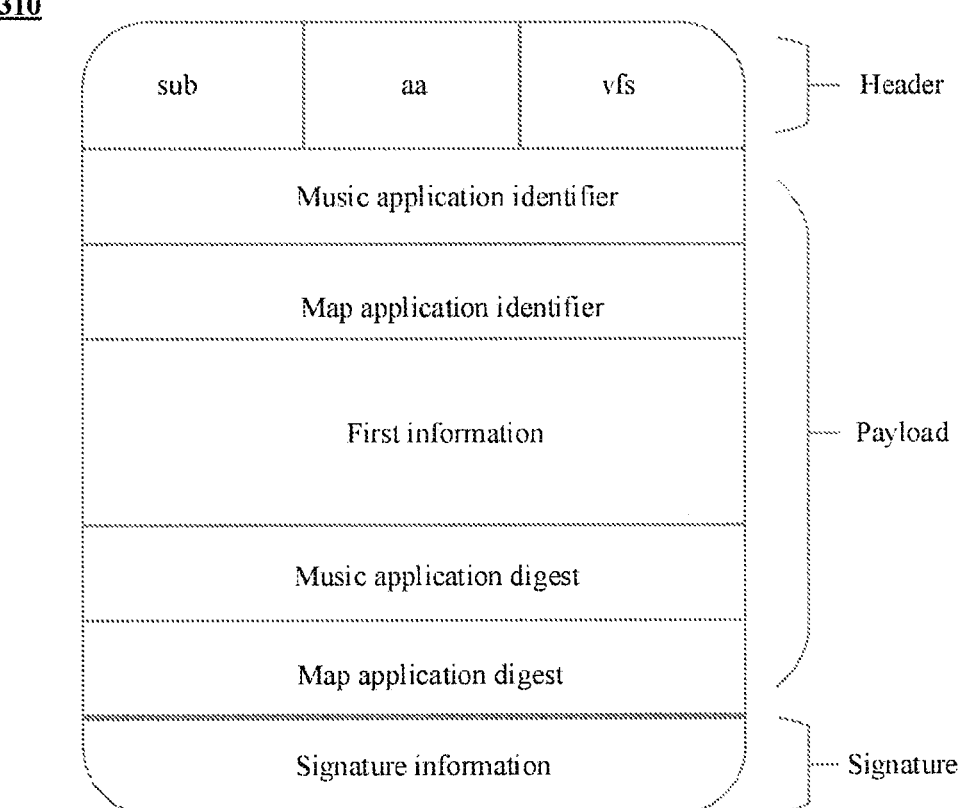
FIG. 3B is a schematic diagram of a structure of another embodiment of a message push request in a JWT format according to an embodiment of this application.

Description is now provided with reference to FIG. 3A and FIG. 3B. FIG. 3A shows an existing message push request data packet 300 in a JWT format. The data packet 300 includes a header, a payload, and a signature. The header of the data packet 300 includes an application identifier field (sub) and a first field (aa), where the sub field is used to indicate a location of the application identifier in the payload, and the aa field is used to identify a location of the declaration information in the payload. The payload of the data packet 300 may include the declaration information and information corresponding to the sub field (for example, the application identifier). The signature of the data packet 300 is used for validity of the identity of the message provider. For example, the message pusher 120 may verify the identity of the message provider 110 to determine validity of the identity of the message provider 110. The signature may be used to identify the identity of the message provider 110. That is, the message push request of the message provider 110 may be verified by verifying the signature, to determine whether the message push request is valid. It can be learned from the foregoing data packet 300 that, the data packet 300 includes only an application identifier field, and after receiving the data packet 300, the message pusher 200 cannot verify the correspondence between the message provider 110 and the message receiver 130. Therefore, the message pusher 200 directly pushes the to-be-pushed message to the message receiver 130 corresponding to the application identifier in the payload information, which may cause message crosstalk and bring a data security problem.

FIG. 3B shows a message push request data packet 310 in a MT format according to this application. The data packet 310 may include a header, a payload, and a signature. In addition to an application identifier field (sub) and a first field (aa), the header of the data packet 310 may further include a digest field (vfs), or may include another field. This is not limited in this embodiment of this application. The vfs field is used to identify a location of digest information in the payload. The payload of the data packet 310 may include declaration information, application identifier information, and digest information. The application identifier information corresponds to the sub field, the digest information corresponds to the vfs field, and the declaration information corresponds to the aa field. The application identifier information includes an identifier of the music application 131 and an identifier of the map application 132. The digest information includes a music application digest and a map application digest. A function of the signature of the data packet 310 is the same as that of the signature of the data packet 300, and details are not described herein again. The data packet 310 carries digest information (for example, the music application digest and the map application digest). Therefore, the message pusher 200 may perform verification based on the digest information, to determine whether the identifier of the map application 132, the music application digest, and the map application digest in the message push request.

During a specific implementation, the message push request may be read by using a push system 121 in the message pusher 120, to obtain the declaration information, the identifier of the music application 131, the identifier of the map application 132, the music application digest, and the map application digest and the declaration information, the identifier of the music application 131, the identifier of the map application 132, the music application digest, and the map application digest may be sent to the verification system 122 in the message pusher 120, so that the verification system 122 can perform verification based on the declaration information, the identifier of the music application 131, the identifier of the map application 132, the music application digest, and the map application digest.

Optionally, before verifying the message push request, the message pusher 120 may further perform identity verification based on signature information in the message push request, where the signature information may be used to verify validity of an identity of the message provider 110. If the signature verification succeeds, it indicates that the identity of the message provider 110 is legal, and further verification may be performed to determine to which message receivers 130 the message provider 110 can push the to-be-pushed message. If the signature verification fails, the message pusher 120 may directly end the verification, and may return a failure message to the message provider 110, to notify the message provider 110 that the message push task fails.

It should be noted that the JWT may be further applied to another scenario. Therefore, in the application scenario of this embodiment of this application, a verification interface corresponding to the JWT, for example, a first interface, may be added between the message provider 110 and the message pusher 120, and the first interface may be configured to transmit the JWT. A code example is as follows:

```
POST /token.oauth2 HTTP/1.1
Host: as.example.com
Content-Type: application/x-www-form-urlencoded
grant_type=urn%3Aietf%3Aparams%3Aoauth%3Agrant-type%3Ajwt-bearer-
with-vfs
    &assertion=eyJhbGciOiJFUzI1NiIsImtpZCI6IjE2In0.eyJpc3Mi[ ... with-vfs].J91-
ZhwP[...omitted for brevity...].
``` to-be-pushed message can be sent to a mobile terminal on which the music application and the map application are installed. In this way, message crosstalk can be avoided, and data security can be ensured.

Further, after generating the message push request, the message provider 110 may send the message push request together with the current to-be-pushed message to the message pusher 120, so that the message pusher 120 may push the to-be-pushed message to the message receiver 130 (for example, a mobile terminal on which the music application 131 and/or the map application 132 are/is installed) corresponding to the identifier of the music application 131 and/or the identifier of the map application 132.

Step 205: The message pusher 120 reads the message push request.

Specifically, after receiving the message push request from the message provider 110, the message pusher 120 may read the message push request to obtain the declaration information, the identifier of the music application 131, the Step 206: The message pusher 120 performs query based on the identifier of the music application 131 and the identifier of the map application 132, to obtain a music application key corresponding to the identifier of the music application 131 and a map application key corresponding to the identifier of the map application 132.

Specifically, because the mapping relationship between the application and the application key is stored in the local database of the message pusher 120, after obtaining the identifier of the music application 131 and the identifier of the map application 132 by reading, the message pusher 120 may query the mapping relationship in the local database of the message pusher 120 based on the identifier of the music application 131 and the identifier of the map application 132, to obtain the music application key corresponding to the identifier of the music application 131 and the map application key corresponding to the identifier of the map application 132.

In a specific implementation, the local database may be disposed in the verification system 122 in the message pusher 120. Therefore, after receiving the identifier of the music application 131 and the identifier of the map application 132 that are sent by the push system 121, the verification system 122 may perform query in the local database of the verification system 122 based on the identifier of the music application 131 and the identifier of the map application 132, to obtain the music application key corresponding to the identifier of the music application 131 and the map application key corresponding to the identifier of the map application 132.

It should be noted that, if either of the music application key corresponding to the identifier of the music application 131 and the map application key corresponding to the identifier of the map application 132 is not found through query by the verification system 122, it may be considered that the message push request is invalid. Therefore, the verification system 122 may send a verification failure message to the push system 121. After receiving the verification failure message, the push system 121 may end the verification and feed back a failure message to the message provider 110, to notify the message provider 110 that the message push task fails.

Step 207: The message pusher 120 performs digest extraction on the declaration information, the identifier of the music application 131, and the identifier of the map application 132 by using the music application key, to generate a music application digest, and performs digest extraction on the declaration information, the identifier of the music application 131, and the identifier of the map application 132 by using the map application key, to generate a map application digest.

Specifically, after obtaining the music application key and the map application key by query, the message pusher 120 may perform digest extraction on the declaration information, the identifier of the music application 131, and the identifier of the map application 132 by using the music application key, to generate the corresponding music application digest, and perform digest extraction on the declaration information, the identifier of the music application 131, and the identifier of the map application 132 by using the map application key, to generate the corresponding map application digest. A digest extraction manner may be the same as the manner in step 203, for example, an HASH-MAC512 manner, and details are not described herein again.

Step 208: The message pusher 120 compares the music application digest generated at the message pusher 120 with the music application digest in the message push request, and compares the map application digest generated at the message pusher 120 with the map application digest in the message push request.

Specifically, after generating the music application digest and the map application digest, the message pusher 120 may compare the generated music application digest with the music application digest in the message push request, and compare the generated map application digest with the map application digest in the message push request, to verify the message push request.

Step 209: If both the music application digest comparison and the map application digest comparison succeed, the message pusher 120 pushes the to-be-pushed message to the message receiver 130 on which the music application 131 and/or the map application 132 are/is installed.

Specifically, if both the music application digest comparison and the map application digest comparison succeed, for example, the music application digest generated by the message pusher 120 is consistent with the music application digest in the message push request, and the map application digest generated by the message pusher 120 is consistent with the map application digest in the message push request, it may be considered that the verification on the message push request succeeds, and the message pusher 120 may push the to-be-pushed message to the message receiver 130 on which the music application 131 and/or the map application 132 are/is installed.

Step 210: If either of the music application digest comparison and the map application digest comparison fails, the message pusher 120 returns a verification failure message to the message provider 110.

Specifically, if either of the music application digest comparison and the map application digest comparison fails, it may be considered that the verification on the message push request fails. The message pusher 120 may send a verification failure message to the message provider 110, to notify the message provider 110 that the message push task fails, and end the message push.

In this embodiment, verification is performed at the message pusher 120 based on the digest information in the message push request to determine whether the digest information in the message push request is consistent with the digest information generated by the message pusher 120. In addition, it may be further determined whether the to-be-pushed message can be sent to the application corresponding to the application identifier in the message push request. In this way, message crosstalk can be avoided, and security of message push can be improved.

In FIG. 2 and FIG. 3, an example in which the message provider 110 sends two to-be-pushed messages respectively corresponding to the music application 131 and the map application 132 and performs digest comparison is used for description. It may be understood that the message provider 110 may push messages to only one or more than two applications, the principles are similar, and details are not described herein again.

The following describes another message push method by using an example in which the message provider 110 separately sends two to-be-pushed messages corresponding to the music application 131 and the map application 132 and compares data sources.

Figure 4:
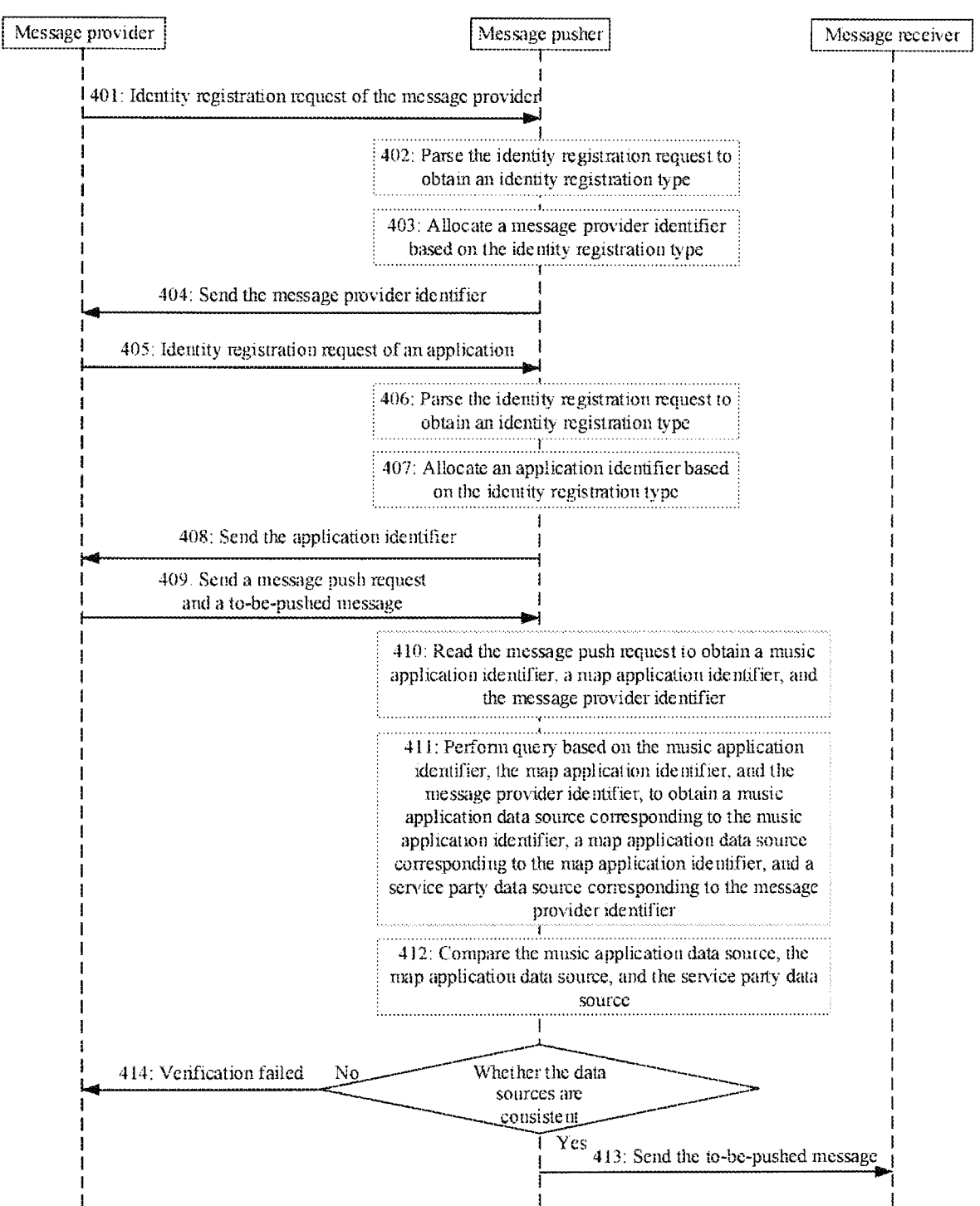
FIG. 4 is a schematic flowchart of an interaction procedure of another embodiment of a message push request method according to an embodiment of this application.

FIG. 4 is a schematic flowchart of an interaction procedure of another embodiment of a message push method according to this application. The method includes the following steps:

Step 401: The message provider 110 sends an identity registration request to a message pusher 120 to obtain an identifier of the message provider 110.

Specifically, the identity registration request may be used by the message provider 110 to request to obtain the identifier of the message provider 110 from the message pusher 120. It should be noted that the message provider 110 has an identifier, and the identifier of the message provider 110 is used to identify the message provider 110 in a network, but different from the identifier of the message provider, the identifier obtained by the request is used to subsequently verify the message push request at the message pusher 120, where the identifier obtained by the request may be represented by a number. For ease of description, the identifier of the message provider 110 mentioned below refers to the identifier requested by the message provider 110 or allocated by the message pusher 120 to the message provider 110.

The identity registration request may include an identity registration type. The identity registration type is used by the message pusher 120 to identify a target object registered by the message provider 110 this time. It may be identified, by using the identity registration type, whether to register an identifier for the application or register an identifier for the message provider 110 this time. For example, the identity registration type may include an application type and a service party type. If the message pusher 120 identifies that the identity registration type is an application type, the message pusher 120 may register an identifier for the application, to complete identity registration of the application with the message pusher 120. If the message pusher 120 identifies that the type is a service party type, the message service party type, that is, the identity is registered for the message provider 110 this time.

Further, a registration interface may be further established between the message provider 110 and the message pusher 120, so that the message provider 110 may invoke the registration interface to transmit the identity registration request and complete the identity registration process. A code example is as follows:

```
POST /register HTTP/1.1
Content-Type: application/json
Accept: application/json
Host: server.example.com
{
"redirect_uris": [
"https://client.example.org/callback",
"https://client.example.org/callback2"],
"client _name": "My Example Client",
"client_name#ja-Jpan-JP":"\u30AF\u30E9\u30A4\u30A2\u30F3\u30C8\u540D",
"token_endpoint_auth_method": "client_secret_basic",
"logo_uri": "https://client.example.org/logo.png",
"jwks_uri": "https://client.example.org/my_public_keys.jwks",
"example_extension_parameter": "example_value",
"source": "example_source".
"evidence":"example_evidence"
}.
``` pusher 120 may register an identifier for the message provider 110, to complete identity registration of the message provider 110 with the message pusher 120.

In addition, the identity registration request may further include a data source. The data source may be used to represent a source address of data of each service provided by the message provider 110. The data source may correspond to the message provider 110. For example, the data source may be an address of a target server that stores service data by the message provider 110, for example, assuming that the message provider 110 may provide a meal ordering service, a music service, and a map service, addresses of servers that provide the foregoing meal ordering service, music service, and map service may be a same address, that is, a data source corresponding to the message provider 110 should be the same as data sources of all applications (for example, a meal ordering application, a music application, and a map application) belonging to the same message provider 110, that is, the data sources are the same, a user may receive the meal ordering service by using the meal ordering application on a mobile terminal, receive the music service by using the music application 131 on the mobile terminal, and receive the map service by using the map application 132 on the mobile terminal. During a specific implementation, the data source may be represented by using a unique IP address, or may be represented by using a unique ID number. This is not limited in this embodiment of this application.

During a specific implementation, the identity registration request may carry two fields, for example, a data source (source) field and a type (evidence) field. The source field may be used to identify a data source corresponding to the message provider 110, and the evidence field may be used to identify an identity registration type of this registration. The evidence field may include two numeric types, for example, a character type and a numeric type. For example, if a value of the evidence field is a character string NEW_APP, that is, a numeric type of the evidence field is a character type, the message pusher may determine, based on the identity registration request, that the identity registration type is a Step 402: The message pusher 120 reads the identity registration request to obtain an identity registration type in the identity registration request.

Step 403: If it is determined that the identity registration type is a service party type, the message pusher 120 allocates an identifier of the message provider 110 and stores the identifier of the message provider 110 after associating the identifier of the message provider 110 with the data source in the identity registration request.

Specifically, after receiving the identity registration request, the message pusher 120 reads the identity registration request to obtain the data source and the identity registration type in the identity registration request. If it is determined after reading that the identity registration type is the service party type, an identifier may be allocated to the message provider 110, the identifier of the message provider 110 may be associated with the data source in the identity registration request and then stored, and then the identifier of the message provider 110 may be sent to the message provider 110. The data source stored in association with the identifier of the message provider 110 may be considered as a service party data source.

In a specific implementation, the identity registration request of the message provider 110 may be directly sent to the verification system 122 of the message pusher 120. After receiving the identity registration request, the verification system 122 may first read an evidence field in the identity registration request. If a value of the evidence field is a character string, for example, it may be NEW_APP, which may be considered that the identifier of the message provider 110 is allocated this time, the verification system 122 may allocate an identifier, and the allocated identifier is used as an identifier subsequently used by the message provider 110 for verification, where the identifier of the message provider 110 may be a number. Then, the verification system 122 may store the identifier of the message provider 110 in the local database of the verification system 122 after associating the identifier of the message provider 110 with the source field information in the identity registration request, and return the identifier of the message provider 110 to the message provider 110. Therefore, the message provider 110 completes the task of registering the identifier of the message provider 110 with the message pusher 120.

After parsing out the evidence field information, the verification system 122 may further read the source field information, and may query the local database of the verification system 122 to check whether a data source corresponding to the source field information already exists. If the data source corresponding to the source field information already exists, in this case, it may be considered that the data source is registered, that is, the current registration request may be ended, and a failure message may be returned to the message provider 110, to notify the message provider that the current registration fails. If the data source corresponding to the source field information does not exist, the identifier of the message provider 110 may be allocated.

Step 404: The message pusher 120 sends the allocated identifier of the message provider 110 to the message provider 110.

Step 405: The message provider 110 sends an identifier registration request to the message pusher 120, to obtain an application identifier.

Similarly, the application identifier is different from the identifier of the application, and is an identifier that is requested to be allocated and subsequently used for message push request verification. For ease of description, the application identifier mentioned below refers to an identifier that the message provider 110 requests to obtain for the application or that the message pusher 120 allocates for the application.

Specifically, after the message provider 110 completes registration with the message pusher 120, that is, after obtaining the identifier allocated by the message pusher 120, the message provider 110 may further register, by using the identity registration request, the identifier for the application corresponding to the message provider 110. For example, if the message provider 110 includes a meal ordering application, a music application, and a map application, the message provider 110 may register the meal ordering application, the music application, and the map application, to obtain identifiers corresponding to the meal ordering application, the music application, and the map application. It should be noted that the message provider 110 may register an identifier for one application by using one identity registration request, or the message provider 110 may separately register identifiers for a plurality of applications by using one identity registration request. This is not specially limited in this embodiment of this application.

In a specific implementation, as described above, because the identifier allocated to the message provider 110 may be represented by a number, the value of the evidence field may be set to the identifier of the message provider 110, that is, the numeric type of the evidence field is the numeric type representing the identifier of the message provider 110, so that the message pusher 120 may determine, based on the identity registration request, that the identity registration type is the application type. That is, it indicates that the identifier is registered for the corresponding application in the message provider 110 this time, and it may also indicate that the currently registered application is associated with the message provider 110 corresponding to the value of the evidence field. For example, assuming that a message provider corresponding to a value of the evidence field is AA, an identifier may be registered for a music application 131 to which the message provider AA belongs, or an identifier may be registered for a map application 132 to which the message provider AA belongs, or an identifier may be registered for another application (a meal ordering application) to which the message provider AA belongs.

Step 406: The message pusher 120 reads the identity registration request to obtain an identity registration type in the identity registration request.

Step 407: If it is determined that the current identity registration type is the application type, the message pusher 120 allocates an application identifier and stores the application identifier after associating the application identifier with the data source.

Specifically, if the message pusher 120 determines, by reading the identity registration request, that the identity registration type is the application type, the message pusher 120 may allocate the application identifier, and store the application identifier after associating the application identifier with the data source, and then send the application identifier to the message provider 110. The data source stored in association with an application may be considered as an application data source. For example, the data source stored in association with the music application may be considered as a music application data source, the data source stored in association with the map application may be considered as a map application data source, and the data source stored in association with the meal ordering application may be considered as a meal ordering application data source or the like.

In a specific implementation, the identity registration request of the message provider 110 may be directly sent to the verification system 122 of the message pusher 120. After receiving the identity registration request, the verification system 122 may first read the evidence field in the identity registration request. If the value of the evidence field is a number, in this case, it may be considered that the application identifier is allocated this time. As described above, the value of the evidence field may be an identifier of the message provider 110. It may be determined that an identifier is allocated to the application, and it may be further known that the application registered this time is an application corresponding to the message provider 110 corresponding to the numeric value in the evidence field. Then, the local database in the verification system 122 may be queried based on the identifier of the message provider 110 in the evidence field, to obtain the service party data source corresponding to the identifier of the message provider 110. In addition, the data source obtained through query may be compared with the data source corresponding to the source field information in the identity registration request. If the service party data source obtained through query is inconsistent with the data source corresponding to the source field information in the identity registration request, the registration request may be ended. In addition, a failure message may be returned to the message provider 110 to notify the message provider that the registration fails. If the service party data source obtained through query is consistent with the data source corresponding to the source field information in the identity registration request, an application identifier may be allocated, and the application identifier is stored after being associated with the data source corresponding to the source field information in the identity registration request, and the application identifier is sent to the message provider 110, so that the message provider 110 completes the task of registering the application identifier with the message pusher 120.

Step 408: The message pusher 120 sends the allocated application identifier to the message provider 110.

Step 409: The message provider 110 sends the message push request and the to-be-pushed message to the message pusher 120.

Specifically, after completing the identity registration task, the message provider 110 may send the message push request and the to-be-pushed message to the message pusher 120. For example, the message push request may include an identifier of the message provider 110, an identifier of the music application 131, and an identifier of the map application 132, and the message push request may be in a form of a JWT.

Figure 5:
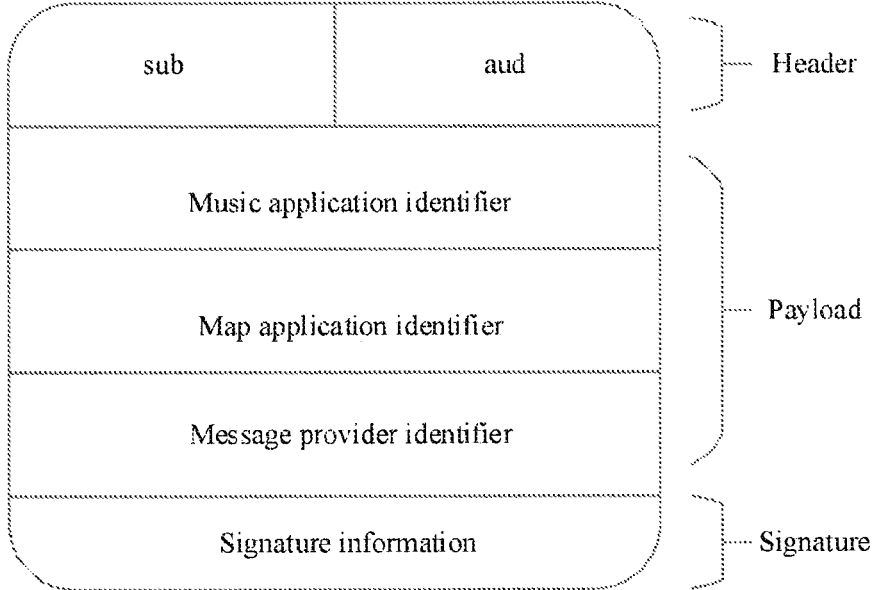
FIG. 5 is a schematic diagram of a structure of still another embodiment of a message push request in a JWT format according to an embodiment of this application.

Description is now provided with reference to FIG. 5. As shown in FIG. 5, the JWT may include a header, a payload, and a signature. The JWT header may include a plurality of fields. For example, the JWT header may include an application identifier field (sub) and a message provider identifier field (aud), where the sub field is used to identify a location of the application identifier in the payload, and the aud field is used to identify a location of the message provider identifier in the payload. The payload may include data information corresponding to the field information. For example, the data information may include application identifier information (for example, the identifier of the music application 131 and the identifier of the map application 132) corresponding to the sub field, and the identifier information of the message provider 110 corresponding to the aud field.

Step 410: The message pusher 120 reads the message push request, and obtains the identifier of the message provider 110, the identifier of the music application 131, and the identifier of the map application 132.

Specifically, after receiving the message push request, the message pusher 120 may read the message push request, to obtain the application identifier (for example, the identifier of the music application 131 and the identifier of the map application 132) and the identifier of the message provider 110 in the message push request.

In a specific implementation, the message provider 110 may send the message push request to the push system 121 of the message pusher 120. Therefore, a second interface may be established between the message provider 110 and the push system 121 to transmit the message push request. A code example is as follows:

```
POST /token.oauth2 HTTP/1.1
Host: as.example.com
Content-Type: application/x-www-form-urlencoded
grant_type=urn%3Aietf%3Aparams%3Aoauth%3Agrant-type%3Ajwt-bearer-with-
source
    &assertion=eyJhbGciOiJFUzI1NilsmtpZCI6IjE2In0.eyJpc3Mi[...omitted        for
brevity...].J9l-ZhwP[...omitted for brevity...].
```

Step 411: The message pusher 120 performs query, based on the identifier of the music application 131, the identifier of the map application 132, and the identifier of the message provider 110, to obtain a music data source corresponding to the identifier of the music application 131, a map data source corresponding to the identifier of the map application 132, and the service party data source corresponding to the identifier of the message provider 110.

Specifically, after obtaining the identifier of the message provider 110, the identifier of the music application 131, and the identifier of the map application 132 in the message push request, the message pusher 120 may obtain, by query, the application data source corresponding to the identifier of the music application 131 and the identifier of the map application 132 (for example, the music application data source corresponding to the identifier of the music application 131 and the map application data source corresponding to the identifier of the map application 132), and the service party data source corresponding to the identifier of the message provider 110.

In a specific implementation, after obtaining the identifier of the music application 131, the identifier of the map application 132, and the identifier of the message provider 110 through reading, the push system 121 of the message pusher 120 may send the identifier of the music application 131, the identifier of the map application 132, and the identifier of the message provider 110 to the verification system 122. After receiving the identifier of the music application 131, the identifier of the map application 132, and the identifier of the message provider 110, the verification system 122 may query the local database of the verification system 122 to respectively obtain the music application data source, the map application data source, and the service party data source corresponding to the identifier of the music application 131, the identifier of the map application 132, and the identifier of the message provider 110.

Further, when the verification system 122 queries, if at least one of the music application data source, the map application data source, and the service party data source does not exist, it may be considered that a counterfeiter exists in the current identifier of the music application 131, the identifier of the map application 132, and the identifier of the message provider 110. Therefore, the verification may be ended, and a verification failure message may be returned to the push system 121. After receiving the verification failure message, the push system 121 may stop the message push task, and may return a failure message to the message provider 110.

Step 412: The message pusher 120 compares the music application data source, the map application data source, and the service party data source.

Specifically, the data source comparison may include separately comparing the music application data source and the map application data source with the service party data source. In a specific implementation, after obtaining the music application data source, the map application data source, and the service party data source by query, the verification system 122 of the message pusher 120 may separately compare the music application data source and the map application data source with the service party data source. For example, the music application data source may be first compared with the service party data source, and then the map application data source is compared with the service party data source; or the map application data source may be first compared with the service party data source, and then the music application data source may be compared with the service party data source. Alternatively, the music application data source may be compared with the service party data source and the map application data source may be compared with the service party data source at the same time. This is not specially limited in this embodiment of this application.

Step 413: If the data sources are consistent through comparison, push the to-be-pushed message sent by the message provider 110 to the message receiver 130 on which the music application 131 and/or the map application 132 are/is installed.

Specifically, if the data sources are consistent through comparison, the message pusher 120 may push the to-be-pushed message sent by the message provider 110 to the message receiver 130 on which the music application 131 and/or the map application 132 are/is installed. For example, if the music application data source is consistent with the service party data source through comparison, and the map application data source is consistent with the service party data source through comparison, it may be considered that the data sources are consistent through comparison.

During a specific implementation, the foregoing data sources are compared in the verification system 122 to determine that the foregoing data sources are consistent. For example, if the music application data source is consistent with the service party data source, and the map application data source is consistent with the service party data source, it may be considered that the verification succeeds. The verification system 122 may send a verification success message to the push system 121. After receiving the verification success message from the verification system 122, the push system 121 may push the to-be-pushed message received this time to the message receiver 130 on which the music application 131 and/or the map application 132 are/is installed.

Step 414: If at least one group of data sources in the foregoing data source comparison are inconsistent, end the message push task, and return a verification failure message to the message provider 110.

Specifically, if at least one group of data sources in the foregoing data source comparison are inconsistent, it may be considered that the verification fails, and the message pusher 120 may end the current message push task. For example, if the music application data source is inconsistent with the service party data source, and/or the map application data source is inconsistent with the service party data source, it may be considered that the data sources are inconsistent.

During a specific implementation, the foregoing data sources are compared in the verification system 122. If it is determined that at least one group of data sources in the foregoing data sources are inconsistent, for example, the music application data source is inconsistent with the service party data source, and/or the map application data source is inconsistent with the service party data source, in this case, it may be considered that the verification fails. The verification system 122 may send a verification failure message to the push system 121. If the push system 121 receives the verification failure message from the verification system 122, the push system 121 may stop the current message push task, and may return a verification failure message to the message provider 110.

In this embodiment, verification is performed at the message pusher 120 based on the data source in the message push request, to determine whether the data source of the application corresponding to the to-be-pushed message is consistent with the data source of the message provider. In addition, it may be further determined whether the to-be-pushed message can be sent to the application corresponding to the application identifier in the message push request. In this way, message crosstalk can be avoided, and security of message push can be improved.

Figure 6:
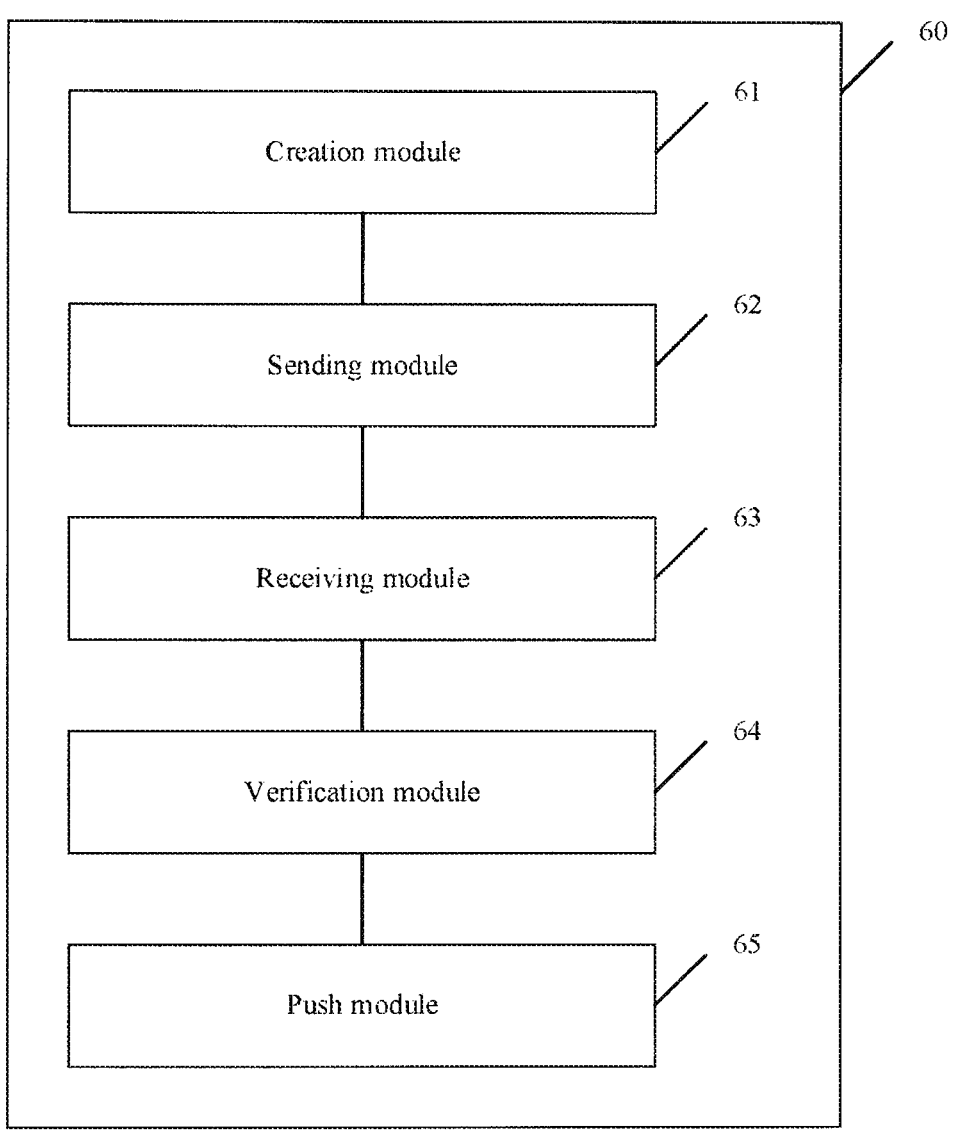
FIG. 6 is a schematic diagram of a structure of a message push apparatus according to an embodiment of this application.

FIG. 6 is a schematic diagram of a structure of a message push apparatus according to an embodiment of this application. As shown in FIG. 6, the message push apparatus 60 may include a creation module 61, a sending module 62, a receiving module 63, a verification module 64, and a push module 65.

The creation module 61 is configured to create a mapping relationship between an application identifier and a preset key.

The sending module 62 is configured to send the mapping relationship to a message provider.

The receiving module 63 is configured to receive a to-be-pushed message and a message push request that are sent by the message provider, where the message push request includes first information and a first digest used for verification, the first digest is obtained after the message provider performs digest extraction on the first information by using the preset key, and the first information includes at least the application identifier.

The verification module 64 is configured to query whether the preset key corresponding to the application identifier in the message push request exists; and if the preset key corresponding to the application identifier exists, perform digest extraction on the first information in the message push request by using the preset key, to obtain a second digest.

The push module 65 is configured to compare the second digest with the first digest, and push the to-be-pushed message to a message receiver corresponding to the application identifier if the second digest is consistent with the first digest.

In a possible implementation, the message push apparatus 60 may further include a signature verification module 66.

The signature verifying module 66 is configured to perform identity authentication on the message push request based on the signature to determine whether an identity of the message provider is legal.

In a possible implementation, the verification module 64 may be further configured to: if the preset key corresponding to the application identifier does not exist, terminate push of the current to-be-pushed message.

In a possible implementation, the first information includes a plurality of application identifiers, the message push request includes a plurality of first digests corresponding to the application identifiers, and the verification module 64 is further configured to separately perform digest extraction on the first information in the message push request by using preset keys corresponding to the application identifiers, to obtain a plurality of second digests corresponding to the application identifiers.

In a possible implementation, the push module 65 may be further configured to compare the first digest and the second digest that correspond to a same application identifier; and if the first digests and the second digests of all the application identifiers are consistent, push the to-be-pushed message to message receivers corresponding to the application identifiers.

Figure 7:
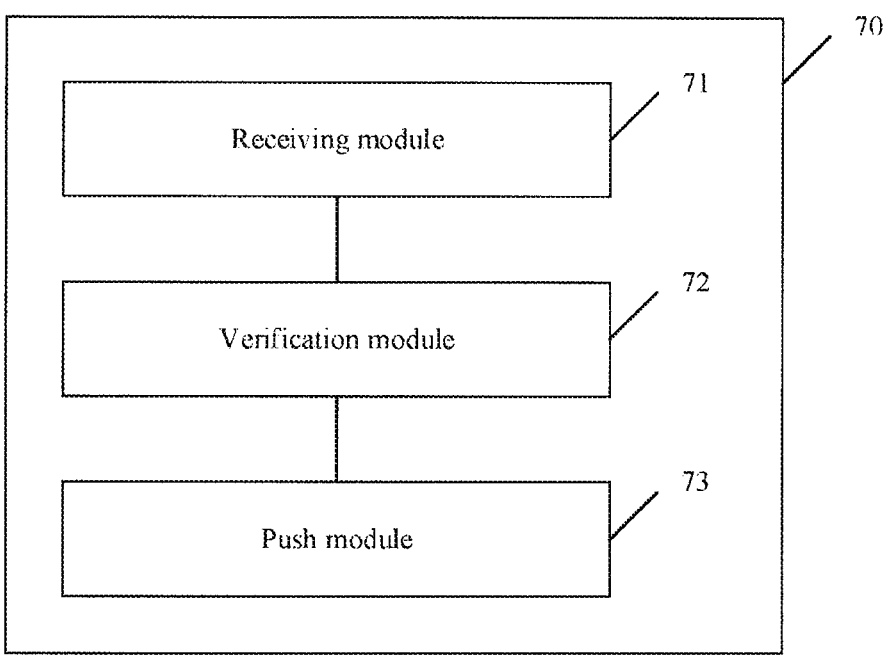
FIG. 7 is a schematic diagram of a structure of another message push apparatus according to an embodiment of this application.

FIG. 7 is a schematic diagram of a structure of another message push apparatus according to an embodiment of this application. As shown in FIG. 7, the message push apparatus 70 may include a receiving module 71, a verification module 72, and a push module 73.

The receiving module 71 is configured to receive a to-be-pushed message and a message push request that are sent by a message provider, where the message push request includes an application identifier and a message provider identifier.

The verification module 72 is configured to query whether a first data source corresponding to the application identifier in the message push request and a second data source corresponding to the message provider identifier in the message push request exist.

The push module 73 is configured to: if the first data source and the second data source exist, compare the first data source with the second data source, and if the first data source is consistent with the second data source, push the to-be-pushed message to a message receiver corresponding to the application identifier.

In a possible implementation, the message push apparatus 70 further includes a registration module 74.

The registration module 74 is configured to: receive an identity registration request sent by the message provider, where the identity registration request includes a data source and an identity registration type, and the identity registration type includes a first type and a second type; and if it is determined that the identity registration type is the first type, determine that the data source includes a first data source, allocate a message provider identifier, associate the message provider identifier with the first data source for storage, and send the message provider identifier to the message provider; or if it is determined that the identity registration type is the second type, determine that the data source includes a second data source, allocate an application identifier, associate the application identifier with the second data source for storage, and send the application identifier to the message provider.

In a possible implementation, if it is determined that the identity registration type is the second type, the identity registration request further includes a message provider identifier, and the message push apparatus 70 further includes a check module 75.

The check module 75 is configured to: perform query based on the message provider identifier to obtain a corresponding first data source; and compare the first data source obtained through query with the second data source in the identity registration request, and determine, based on a comparison result, whether to allocate an application identifier.

In a possible implementation, the message push request includes a plurality of application identifiers, and the push module 73 may be further configured to: compare each first data source and each second data source corresponding to the application identifier; and if each first data source is consistent with each second data source, push the to-be-pushed message to message receivers corresponding to the application identifiers.

It should be understood that division of the modules of the message push apparatuses shown in FIG. 6 and FIG. 7 is merely logical function division. In an actual implementation, the modules may be all or partially integrated into a physical entity, or may be physically separated. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a detection module may be an independently disposed processing component, or may be integrated into a chip of an electronic device for implementation. Implementations of other modules are similar to this. In addition, the modules may be all or partially integrated, or may be implemented independently. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, for example, one or more application-specific integrated circuits (Application-Specific Integrated Circuit, ASIC for short), or one or more microprocessors (Digital Signal Processor, DSP for short), or, one or more field programmable gate arrays (Field Programmable Gate Array, FPGA for short) or the like. For another example, these modules may be integrated and implemented in a form of a system-on-a-chip (System-On-a-Chip, SOC for short).

Figure 8:
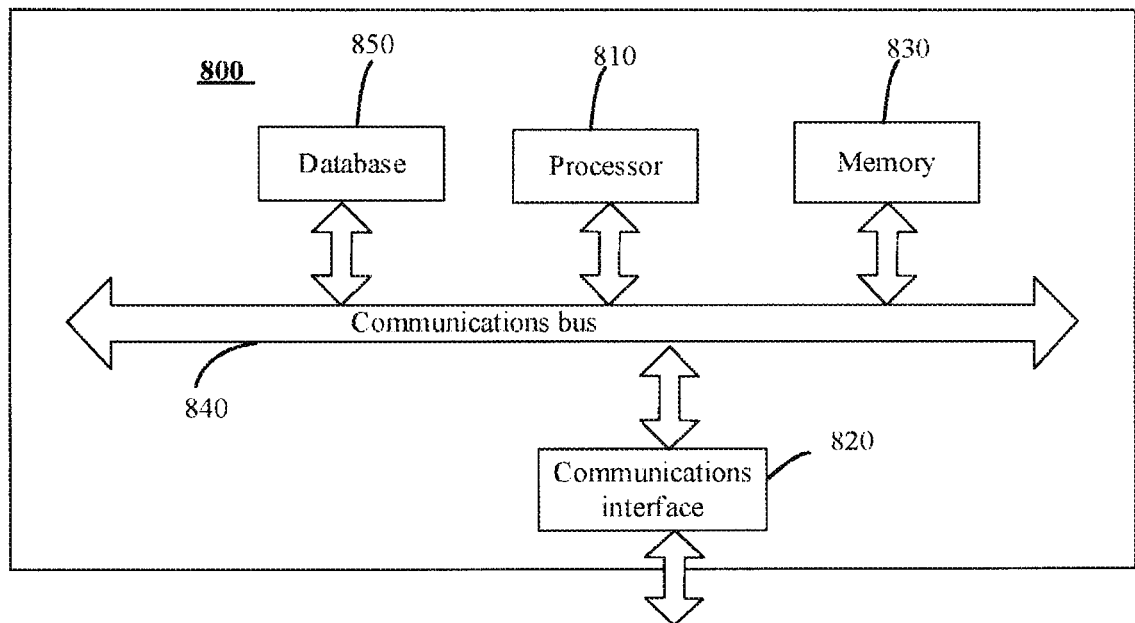
FIG. 8 is a schematic diagram of a structure of an electronic device according to an embodiment of this application.

FIG. 8 is a schematic diagram of a structure of an electronic device according to an embodiment of this application. A message pusher 120 may be the electronic device. As shown in FIG. 8, the electronic device may be a data processing device, for example, a server, or may be a circuit device built in the data processing device. The electronic device mays be configured to perform functions/steps in the methods provided in embodiments shown in FIG. 1 to FIG. 5 of this application.

As shown in FIG. 8, the electronic device 800 is represented in a form of a general-purpose computing device.

The electronic device may include one or more processors 810, a communications interface 820, a memory 830, a communications bus 840 connecting various system components (including the memory 830 and the processor 810), a database 850, and one or more computer programs.

The one or more computer programs are stored in the memory, the one or more computer programs include instructions, and when the instructions are executed by the electronic device, the electronic device is enabled to perform the following steps:

creating a mapping relationship between an application identifier and a preset key;

sending the mapping relationship to a message provider;

receiving a to-be-pushed message and a message push request that are sent by the message provider, where the message push request includes first information and a first digest used for verification, the first digest is obtained after the message provider performs digest extraction on the first information by using the preset key, and the first information includes at least the application identifier;

querying whether the preset key corresponding to the application identifier in the message push request exists;

if the preset key corresponding to the application identifier exists, performing digest extraction on the first information in the message push request by using the preset key, to obtain a second digest; and comparing the second digest with the first digest, and pushing the to-be-pushed message to a message receiver corresponding to the application identifier if the second digest is consistent with the first digest.

In a possible implementation, the message push request further includes a signature of the message provider, and when the instructions are executed by the electronic device, before comparing the second digest with the first digest, the electronic device further executes the following step:

performing identity authentication on the message provider based on the signature to determine whether an identity of the message provider is legal.

In a possible implementation, when the instructions are executed by the electronic device; the electronic device is further enabled to perform the following step:

if the preset key corresponding to the application identifier does not exist, terminating push of the current to-be-pushed message.

In a possible implementation, the first information includes a plurality of application identifiers, the message push request includes a plurality of first digests corresponding to the application identifiers, and when the instructions are executed by the electronic device, that the electronic device is enabled to perform the step of performing digest extraction on the first information in the message push request by using the preset key, to obtain a second digest includes:

separately performing digest extraction on the first information in the message push request by using preset keys corresponding to the application identifiers, to obtain a plurality of second digests corresponding to the application identifiers.

In a possible implementation, when the instructions are executed by the electronic device; that the electronic device is enabled to perform the step of comparing the second digest with the first digest, and pushing the to-be-pushed message to a message receiver corresponding to the application identifier if the second digest is consistent with the first digest includes:

comparing a first digest and a second digest that correspond to a same application identifier; and if first digests and second digests of all the application identifiers are consistent, pushing the to-be-pushed message to message receivers corresponding to the application identifiers.

An embodiment of this application further provides an electronic device. As shown in FIG. 8, the one or more computer programs are stored in the memory, the one or more computer programs include instructions, and when the instructions are executed by the electronic device, the electronic device is enabled to perform the following steps:

receiving a to-be-pushed message and a message push request that are sent by a message provider, where the message push request includes an application identifier and a message provider identifier;

querying whether a first data source corresponding to the application identifier in the message push request and a second data source corresponding to the message provider identifier in the message push request exist; and if the first data source and the second data source exist, comparing the first data source with the second data source, and if the first data source is consistent with the second data source, pushing the to-be-pushed message to a message receiver corresponding to the application identifier.

In a possible implementation, when the instructions are executed by the electronic device, before receiving the to-be-pushed message and the message push request that are sent by the message provider, the electronic device is further enabled to perform the following steps:

receiving an identity registration request sent by the message provider, where the identity registration request includes a data source and an identity registration type, and the identity registration type includes a first type and a second type; and if it is determined that the identity registration type is the first type, determining that the data source includes a first data source, allocating a message provider identifier, associating the message provider identifier with the first data source for storage, and sending the message provider identifier to the message provider; or if it is determined that the identity registration type is the second type, determining that the data source includes a second data source, allocating an application identifier, associating the application identifier with the second data source for storage, and sending the application identifier to the message provider.

In a possible implementation, if it is determined that the identity registration type is the second type, the identity registration request further includes a message provider identifier, and when the instructions are executed by the electronic device, the electronic device is enabled to further perform the following steps:

performing query based on the message provider identifier to obtain a corresponding first data source; and comparing the first data source obtained through query with the second data source in the identity registration request, and determining, based on a comparison result, whether to allocate the application identifier.

In a possible implementation, the message push request includes a plurality of application identifiers, and when the instructions are executed by the electronic device, that the electronic device is enabled to perform the step of comparing the first data source with the second data source, and if the first data source is consistent with the second data source, pushing the to-be-pushed message to a message receiver corresponding to the application identifier includes:

comparing each first data source and each second data source corresponding to the application identifier; and if each first data source is consistent with each second data source, pushing the to-be-pushed message to message receivers corresponding to the application identifiers.

An embodiment of this application further provides a computer-readable storage medium. The computer-readable storage medium stores a computer program, and when the computer program is run on a computer, the computer is enabled to perform the methods provided in embodiments shown in FIG. 1 to FIG. 5 of this application.

In embodiments of this application, the foregoing device and the like may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, the module division in embodiments of the present invention is an example and is merely logical function division. There may be another division manner in an actual implementation.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above. For a detailed working process of the foregoing system, apparatus, and unit, refer to a corresponding process in the foregoing method embodiments, and details are not described herein again.

Function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, for example, a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method performed by a message pusher and comprising:

creating a mapping relationship between a first application identifier and a first preset key;

sending the mapping relationship to a message provider;

receiving a to-be-pushed message and a message push request from the message provider, wherein the message push request comprises first information and a plurality of received digests corresponding to a plurality of application identifiers and including a first received digest for verification, wherein the first received digest is based on the first information and the first preset key, and wherein the first information comprises the application identifiers including the first application identifier;

querying the mapping relationship with the first application identifier to obtain the first preset key;

extracting, with the first preset key, a digest from the first information to obtain a first obtained digest;

comparing the first obtained digest with the first received digest;

pushing, when the first obtained digest matches the first received digest, the to-be-pushed message to a message receiver corresponding to the first application identifier, wherein the to-be-pushed message is not delivered when the first obtained digest does not match the first received digest; and performing a digest extraction on the first information using preset keys corresponding to the application identifiers to obtain a plurality of obtained digests corresponding to the application identifiers, and wherein the preset keys comprise the first preset key.

2. The method of claim 1, wherein the message push request further comprises a signature of the message provider, and wherein before comparing the first obtained digest with the first received digest, the method further comprises performing identity authentication on the message provider based on the signature to determine whether an identity of the message provider is legal.

3. The method of claim 1, further comprising:

identifying that the first preset key does not exist at the message pusher; and terminating, in response to identifying that the first preset key does not exist at the message pusher, push of a current to-be-pushed message.

4. The method of claim 1, further comprising sending a verification failure message to the message provider when the first obtained digest is not the same as the first receive digest.

5. The method of claim 1, wherein before querying whether the first preset key exists at the message pusher, the method further comprises reading the message push request.

6. The method of claim 1, further comprising further querying, in a local database, whether the first preset key exists at the message pusher.

7. The method of claim 1, wherein the message push request is in a JSON Web Token (JWT) format and comprises a header, a payload, and a signature, wherein the header comprises an application identifier field and a digest field, wherein the payload comprises the first application identifier corresponding to the application identifier field, declaration information comprising at least one of an issuer, an issuance time, or an issuance effective time, and the first received digest corresponding to the digest field, and wherein the digest field identifies a location of the first received digest in the payload.

8. The method of claim 1, wherein comparing the first obtained digest with the first received digest and pushing the to-be-pushed message to the message receiver comprises:

comparing a corresponding first received digest and a corresponding first obtained digest that correspond to a same application identifier; and pushing the to-be-pushed message to message receivers corresponding to the application identifiers when each of the corresponding first received digest of the received digests is the same as each of the corresponding first obtained digest of the obtained digests.

9. A method performed by a message pusher and comprising:

receiving a to-be-pushed message and a message push request from a message provider, wherein the message push request comprises a first application identifier and a message provider identifier;

comparing, when the message push request comprises a first data source corresponding to the first application identifier and a second data source corresponding to the message provider identifier, the first data source with the second data source;

pushing the to-be-pushed message to a message receiver corresponding to the first application identifier when the first data source matches the second data source, wherein the to-be-pushed message is not delivered when the first data source does not match the second data source;

receiving an identity registration request from the message provider, wherein the identity registration request comprises a third data source and an identity registration type, and wherein the identity registration type comprises a first type or a second type;

associating, when the identity registration type is the first type, the message provider identifier with a second data source for storage, wherein the third data source comprises the second data source; and associating, when the identity registration type is the second type, the first application identifier with the first data source for storage, wherein the third data source comprises the first data source.

10. The method of claim 9, wherein before receiving the to-be-pushed message and the message push request, the method further comprises:

when the identity registration type is the first type:

allocating the message provider identifier;

and sending the message provider identifier to the message provider; and when the identity registration type is the second type:

allocating the first application identifier; and sending the first application identifier to the message provider.

11. The method of claim 10, wherein the identity registration type is the second type, wherein the identity registration request further comprises the message provider identifier, and wherein the method further comprises:

performing a query based on the message provider identifier to obtain the second data source;

comparing the second data source with the first data source to obtain a comparison result; and determining, based on the comparison result, whether to allocate the first application identifier.

12. The method of claim 9, wherein the message push request further comprises a plurality of application identifiers comprising the first application identifier, and wherein the method further comprises:

comparing a corresponding first data source and a corresponding second data source corresponding to a same application identifier; and pushing the to-be-pushed message to message receivers corresponding to the application identifiers when each of the corresponding first data source is the same as the corresponding second data source.

13. An electronic device comprising:

a memory configured to store instructions; and one or more processors coupled to the memory and configured to execute the instructions to cause the electronic device to:

create a mapping relationship between a first application identifier and a first preset key;

send the mapping relationship to a message provider;

receive a to-be-pushed message and a message push request from the message provider, wherein the message push request comprises first information and a plurality of received digests corresponding to a plurality of application identifiers and including a first received digest for verification, wherein the first received digest is based on the first information and the first preset key, and wherein the first information comprises the application identifiers including the first application identifier;

query the mapping relationship with the first application identifier to obtain the first preset key;

extract, with the first preset key, a digest from the first information to obtain a first obtained digest;

compare the first obtained digest with the first received digest;

push, when the first obtained digest matches the first received digest, the to-be-pushed message to a message receiver corresponding to the first application identifier, wherein the to-be-pushed message is not delivered when the first obtained digest does not match the first received digest; and perform a digest extraction on the first information using preset keys corresponding to the application identifiers to obtain a plurality of obtained digests corresponding to the application identifiers, and wherein the preset keys comprise the first preset key.

14. The electronic device of claim 13, wherein the message push request further comprises a signature of the message provider, and wherein before comparing the first obtained digest with the first received digest, the one or more processors are further configured to execute the instructions to cause the electronic device to perform identity authentication on the message provider based on the signature to determine whether an identity of the message provider is legal.

15. The electronic device of claim 13, wherein the one or more processors are further configured to execute the instructions to cause the electronic device to:

identify that the first preset key does not exist; and terminate, in response to identifying that the first preset key does not exist at the electronic device, push of a current to-be-pushed message.

16. The electronic device of claim 13, wherein the one or more processors are further configured to execute the instructions to cause the electronic device to:

compare a corresponding first received digest and a corresponding first obtained digest that correspond to a same application identifier; and push the to-be-pushed message to message receivers corresponding to the application identifiers when each of the corresponding first received digest of the received digests is the same as each of the corresponding first obtained digest of the obtained digests.

17. The electronic device of claim 13, wherein the one or more processors are further configured to execute the instructions to cause the electronic device to send a verification failure message to the message provider when the first obtained digest is not the same as the first received digest.

18. The electronic device of claim 13, wherein before querying whether the first preset key exists at the electronic device, the one or more processors are further configured to execute the instructions to cause the electronic device to read the message push request.

19. The electronic device of claim 13, wherein before querying whether the first preset key exists at the electronic device, the one or more processors are further configured to execute the instructions to cause the electronic device to further query, in a local database, whether the first preset key exists at the electronic device.

20. The electronic device of claim 13, wherein the message push request is in a JSON Web Token (JWT) format and comprises a header, a payload, and a signature, wherein the header comprises an application identifier field and a digest field, wherein the payload comprises the first application identifier corresponding to the application identifier field, declaration information comprising at least one of an issuer, an issuance time, or an issuance effective time, and the first received digest corresponding to the digest field, and wherein the digest field identifies a location of the first received digest in the payload.

* * * * *